(12) United States Patent
Thoreau et al.

(10) Patent No.: US 11,375,191 B2
(45) Date of Patent: Jun. 28, 2022

(54) METHOD AND APPARATUS FOR ADAPTIVE TRANSFORM IN VIDEO ENCODING AND DECODING

(71) Applicant: InterDigital VC Holdings, Inc., Wilmington, DE (US)

(72) Inventors: Dominique Thoreau, Cesson Sévigné (FR); Jean Begaint, Palo Alto, CA (US); Fatma Hawary, Rennes (FR); Fabien Racape, Palo Alto, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/652,395

(22) PCT Filed: Oct. 12, 2018

(86) PCT No.: PCT/US2018/055623
§ 371 (c)(1),
(2) Date: Mar. 30, 2020

(87) PCT Pub. No.: WO2019/075336
PCT Pub. Date: Apr. 18, 2019

(65) Prior Publication Data
US 2020/0296369 A1   Sep. 17, 2020

(30) Foreign Application Priority Data

Oct. 12, 2017  (EP) ..................... 17306382

(51) Int. Cl.
*H04N 19/12* (2014.01)
*H04N 19/186* (2014.01)
*H04N 19/61* (2014.01)

(52) U.S. Cl.
CPC ........... *H04N 19/12* (2014.11); *H04N 19/186* (2014.11); *H04N 19/61* (2014.11)

(58) Field of Classification Search
CPC ....... H04N 19/12; H04N 19/186; H04N 19/61
(Continued)

(56) References Cited

U.S. PATENT DOCUMENTS

| 2004/0017952 A1 | 1/2004 | Acharya et al. |
| 2008/0043840 A1 | 2/2008 | Song |

(Continued)

FOREIGN PATENT DOCUMENTS

| CN | 103139563 A | 6/2013 |
| CN | 103765884 A | 4/2014 |

(Continued)

OTHER PUBLICATIONS

Aurlie Martin et al. "Sparse representations for spatial prediction and texture refinement", Journal of Visual Communication and Image Representation, vol. 22, No. 8, pp. 712-720, Jan. 2011 (Year: 2011).*

(Continued)

*Primary Examiner* — Ayman A Abaza
(74) *Attorney, Agent, or Firm* — Xiaoan Lu (57) ABSTRACT

For a picture with two or more color components, the prediction residuals for the first color component of a block to be encoded may be transformed with a first transform. The transform coefficients for the first color component may go through quantization, de-quantization and inverse transform to obtain reconstructed prediction residuals. Based on the reconstructed prediction residuals for the first color component, the phases of the transform basis function of the first transform can be adjusted to improve the sparsity of the transformed signal. The prediction residuals for the remaining color components may then be transformed with the adjusted transform. In order to determine the phase shift factor, the reconstructed prediction residuals for the first color component may be transformed with the first trans- (Continued)

form, adjusted by different candidate phase shift factors, and the candidate phase shift factor that provides a smallest sparsity measure can be selected for the block.

14 Claims, 4 Drawing Sheets

(58) Field of Classification Search
USPC .................................................. 375/240.03
See application file for complete search history.

(56) References Cited

U.S. PATENT DOCUMENTS

| | | |
|---|---|---|
| 2008/0304759 A1 | 12/2008 | Lee et al. |
| 2013/0329786 A1* | 12/2013 | Thoreau ............... H04N 19/60 375/240.12 |
| 2014/0133551 A1* | 5/2014 | Alshina ............... G06T 3/4007 375/240.03 |

FOREIGN PATENT DOCUMENTS

| | | | |
|---|---|---|---|
| EP | 2597871 A1 | 5/2013 | |
| FR | 2990319 A1 * | 11/2013 | ............ H04N 19/19 |
| FR | 2990319 A1 | 11/2013 | |
| JP | 2013106302 A | 5/2013 | |
| WO | WO2013067667 A1 | 5/2013 | |

OTHER PUBLICATIONS

Kim et. al., "Suggested Design of Initial Software Model for Scalable HEVC Extension Proposal by LG Electronics and MediaTek Inc.", Joint Collaborative Team on Video Coding (JCT-VC) of ITU-T SG16 WP3 and ISO/IEC JTC1/SC29/WG11, 11th meeting, JCTVC-K0370, Shanghai, CN, Oct. 10-19, 2012.

Martin et al., "Sparse representations for spatial prediction and texture refinement", Journal of Visual Communication and Image Representation 22.8 (2011): 712-720.

* cited by examiner

METHOD AND APPARATUS FOR ADAPTIVE TRANSFORM IN VIDEO ENCODING AND DECODING

This application claims the benefit, under 35 U.S.C. § 371 of International Application No. PCT/US18/055623, filed Oct. 12, 2018, which was published on Apr. 18, 2019, which claims the benefit of European Patent Application No. EP17306382.7 filed Oct. 12, 2017.

TECHNICAL FIELD

The present embodiments generally relate to a method and an apparatus for video encoding and decoding, and more particularly, to a method and an apparatus for encoding and decoding with adaptive transform.

BACKGROUND

To achieve high compression efficiency, image and video coding schemes usually, employ prediction and transform to leverage spatial and temporal redundancy in the video content. Generally, intra or inter prediction is used to exploit the intra or inter frame correlation, then the differences between the original block and the predicted block, often denoted as prediction errors or prediction residuals, are transformed, quantized and entropy coded. To reconstruct the video, the compressed data is decoded by inverse processes corresponding to the prediction, transform, quantization and entropy coding.

SUMMARY

According to a general aspect, a method for video decoding is presented, comprising: accessing transform coefficients of a block of a picture, said block including at least a first color component and a second color component; generating prediction residuals for said first color component of said block, based on (1) said accessed transform coefficients for said first color component of said block and (2) a first transform, said first transform corresponding to at least a first set of transform basis functions; determining a phase factor based on said generated prediction residuals for said first color component of said block; and generating prediction residuals for said second color component of said block, based on (1) said accessed transform coefficients for said second color component of said block and (2) a second transform, said second transform corresponding to at least a second set of transform basis functions, wherein a function of said first set of transform basis functions is adjusted based on said determined phase factor to form a respective function of said second set of transform basis functions.

According to another general aspect, a method for video encoding is presented, comprising: accessing prediction residuals of a block of a picture, said picture including at least a first color component and a second color component; transforming said prediction residuals for said first color component of said block to form transform coefficients for said first color component of said block, based on a first transform, said first transform corresponding to at least a first set of transform basis functions; determining reconstructed prediction residuals for said first color component of said block based on said transform coefficients for said first color component of said block; determining a phase factor based on said reconstructed prediction residuals for said first color component of said block; transforming said prediction residuals for said second color component of said block to form transform coefficients for said second color component of said block, based on a second transform, said second transform corresponding to at least a second set of transform basis functions, wherein a function of said first set of transform basis functions is adjusted based on said determined phase factor to form a respective function of said second set of transform basis functions; and encoding said transform coefficients for said first and second color components of said block.

According to another general aspect, an apparatus for video decoding is presented, comprising at least a memory and one or more processors, said one or more processors configured to: accessing transform coefficients of a block of a picture, said block including at least a first color component and a second color component; generating prediction residuals for said first color component of said block, based on (1) said accessed transform coefficients for said first color component of said block and (2) a first transform, said first transform corresponding to at least a first set of transform basis functions; determining a phase factor based on said generated prediction residuals for said first color component of said block; and generating prediction residuals for said second color component of said block, based on (1) said accessed transform coefficients for said second color component of said block and (2) a second transform, said second transform corresponding to at least a second set of transform basis functions, wherein a function of said first set of transform basis functions is adjusted based on said determined phase factor to form a respective function of said second set of transform basis functions.

According to another general aspect, an apparatus for video encoding, comprising at least a memory and one or more processors, said one or more processors configured to: access prediction residuals of a block of a picture, said picture including at least a first color component and a second color component; transform said prediction residuals for said first color component of said block to form transform coefficients for said first color component of said block, based on a first transform, said first transform corresponding to at least a first set of transform basis functions; determine reconstructed prediction residuals for said first color component of said block based on said transform coefficients for said first color component of said block; determine a phase factor based on said reconstructed prediction residuals for said first color component of said block; transform said prediction residuals for said second color component of said block to form transform coefficients for said second color component of said block, based on a second transform, said second transform corresponding to at least a second set of transform basis functions, wherein a function of said first set of transform basis functions is adjusted based on said determined phase factor to form a respective function of said second set of transform basis functions; and encode said transform coefficients for said first and second color components of said block.

According to another general aspect, a video signal is formatted to include encoded transform coefficients for a block of a picture, said block including at least a first color component and a second color component, wherein prediction residuals for said first color component of said block is transformed to form said transform coefficients for said first color component of said block, based on a first transform, said first transform corresponding to at least a first set of transform basis functions, wherein reconstructed prediction residuals for said first color component of said block is formed based on said transform coefficients for said first color component of said block, wherein prediction residuals for said second color component of said block is transformed, based on a second transform, to form transform coefficients for said second color component of said block, said second transform corresponding to at least a second set of transform basis functions, wherein a function of said first set of transform basis functions is adjusted based on a phase factor to form a respective function of said second set of transform basis functions, said phase factor being based on said reconstructed prediction residuals for said first color component of said block.

Said phase factor can be determined based on sparsity, wherein said sparsity can be determined from said reconstructed prediction residuals for said first color component. In one exemplary embodiment, said reconstructed prediction residuals for said first color component are transformed with a plurality of candidate transforms, wherein each candidate transform is based on said first transform and a candidate phase factor of a plurality of candidate phase factors, and said determined phase factor is selected from said plurality of candidate phase factors. In particular, a sparsity is determined based on transform coefficients from a respective one of said plurality of candidate transforms, and wherein the candidate phase factor corresponding to the candidate transform with the smallest sparsity is determined to be said phase factor.

While the sparsity is usually measured based on the number of non-zero coefficients, here, said sparsity for a candidate transform may be measured based on the number of transform coefficients, from said candidate transform, exceeding a threshold. The threshold may be based on a quantization step size for quantizing said block.

When the luminance and chrominance components have different sizes for said block, after said phase factor is determined based on said first color component, said determined phase factor is scaled by a subsampling ratio between said first and second color components in order be used in the transform for said second color component.

When 2D separable transform is used, said first transform may correspond to said first set and a third set of transform basis functions, said second transform may correspond to said second set and a fourth set of transforms basis functions, wherein said determined phase factor is used to adjust all basis functions in said first set of transform basis functions to form said second set of transform basis functions, and another phase factor is determined and used to adjust all basis functions in said third set of transform) basis functions to form said fourth set of transform basis functions. Said first transform can be DCT, DST, a DCT-based transform, a DST-based transform, or a KLT (Karhunen-Loewe Transform). Considering at least computational complexity, elements of the transform matrix corresponding to said second transform may be converted to integers or go through other constraints.

The present embodiments also provide a computer readable storage medium having stored thereon instructions for encoding or decoding video data according to the methods described above. The present embodiments also provide a computer readable storage medium having stored thereon a bitstream generated according to the methods described above. The present embodiments also provide a method and an apparatus for transmitting the bitstream generated according to the methods described above. The present embodiments also provide a computer program product comprising software code instructions for performing the method described above.

DETAILED DESCRIPTION

Figure 1:
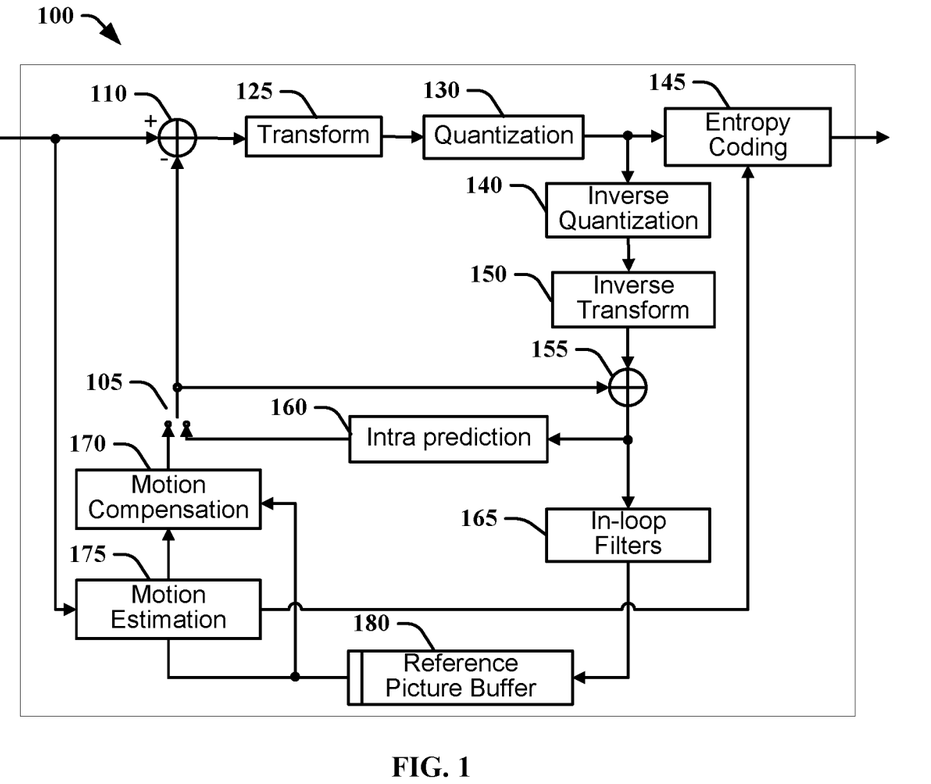
FIG. 1 illustrates a block diagram of an exemplary HEVC (High Efficiency Video Coding) video encoder.

FIG. 1 illustrates an exemplary HEVC encoder 100. To encode a video sequence with one or more pictures, a picture is partitioned into one or more slices where each slice can include one or more slice segments. A slice segment is organized into coding units, prediction units and transform units.

In the present application, the terms "reconstructed" and "decoded" may be used interchangeably, the terms "image," "picture" and "frame" may be used interchangeably. Usually, but not necessarily, the term "reconstructed" is used at the encoder side while "decoded" is used at the decoder side.

The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the tune "block" can be used to refer to any of CTU, CU, PU, TU, CB, PB and TB, In addition, the "block" can also be used to refer to a macroblock and a partition as specified in H.264/AVC or other video coding standards, and more generally to refer to an array of data of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160), In an inter mode, motion estimation (175) and compensation (170) are performed. The encoder decides (105) which one of the intra mode or inter mode to use for encoding the CU, and indicates the infra/inter decision by a prediction mode flag. Prediction residuals are calculated by subtracting (110) the predicted block from the original image block.

In order to exploit the spatial redundancy, CUs in intra mode are predicted from reconstructed neighboring samples within the same slice. The causal neighboring CUs have already been encoded/decoded when the encoding/decoding of the current CU is considered. To avoid mismatch, the encoder and the decoder have the same prediction. Therefore, both the encoder and the decoder use the information from the reconstructed/decoded neighboring causal CUs to form prediction for the current CU.

A set of 35 intra prediction modes is available in HEVC, including a planar (indexed 0), a DC (indexed 1) and 33 angular prediction modes (indexed 2-34), The intra prediction reference is reconstructed from the row and column adjacent to the current block. The reference may extend over two times the block size in horizontal and vertical direction using available samples from previously reconstructed blocks. When an angular prediction mode is used for intra prediction, reference samples can be copied along the direction indicated by the angular prediction mode.

For an inter CU, the corresponding coding block is further partitioned into one or more prediction blocks. Inter prediction is performed on the PB level, and the corresponding PU contains the information about how inter prediction is performed. The motion information (i.e., motion vector and reference picture index) can be signaled in two methods, namely, "merge mode" and "advanced motion vector prediction (AMVP)."

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD. The applicable reference picture index is also explicitly coded in the PU syntax for AMVP.

The prediction residuals are then transformed (125) and quantized (130). HEVC supports transform block sizes of 4×4, 8×8, 16×16, and 32×32. The elements of the core transform matrices were derived by approximating scaled discrete cosine transform (DCT) basis functions. The HEVC transforms are designed under considerations such as limiting the dynamic range for transform computation and maximizing the precision and closeness to orthogonality when the matrix entries are specified as integer values. For simplicity, only one integer matrix for the length of 32 points is specified, and subsampled versions are used for other sizes. For the transform block size of 4×4, an alternative integer transform derived from a discrete sine transform (DST) is applied to the luma residual blocks for intra prediction modes.

The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
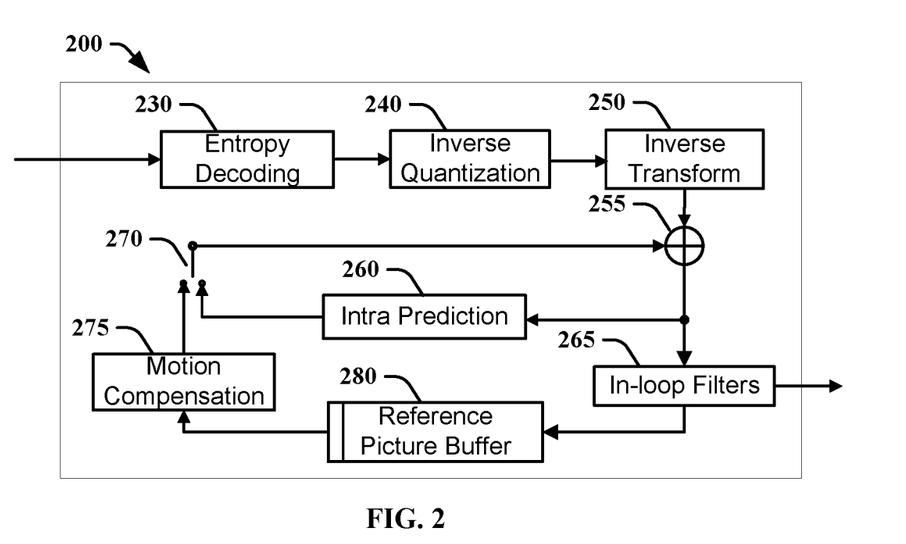
FIG. 2 illustrates a block diagram of an exemplary HEVC video decoder.

FIG. 2 illustrates a block diagram of an exemplary HEVC video decoder 200. In the exemplary decoder 200, a bitstream is decoded by the decoder elements as described below. Video decoder 200 generally performs a decoding pass reciprocal to the encoding pass as described in FIG. 1, which performs video decoding as part of encoding video data.

In particular, the input of the decoder includes a video bitstream, which may be generated by video encoder 100. The bitstream is first entropy decoded (230) to obtain transform coefficients, motion vectors, and other coded information. The transform coefficients are de-quantized (240) and inverse transformed (250) to decode the prediction residuals. Combining (255) the decoded prediction residuals and the predicted block, an image block is reconstructed. The predicted block may be obtained (270) from intra prediction (260) or motion-compensated prediction (i.e., inter prediction) (275), As described above, AMVP and merge mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

Assuming a block of prediction residuals that can be represented by a single 2D basis function, after the DCT transform, the transform coefficients will be sparse because there is only one non-zero DCT coefficient for the block. After quantization, if the non-zero transform coefficient is greater than the quantization step size, only one quantized coefficient needs to be encoded.

Now assuming the block of prediction residuals are spatially shifted, then the resulting transform coefficients may no longer be sparse and may contain several DCT coefficients. We call such a phenomenon as "frequency spread" in the sense that the spectral energy is split on more coefficients, After quantization, we may need to encode more than one non-zero coefficient if more than one DCT coefficient is larger than the quantization step size, and thus may require more bits for encoding. It may also happen that small DCT coefficients may be quantized to 0, which implies reconstruction distortion. It should be noted that a spatial shift in the signal is reflected as a phase difference in the transform domain. Thus, for a spatially shifted block, if the phase of the basis functions is adjusted in accordance with the signal of prediction residuals, only one quantized coefficient may be needed and thus save the bits.

In the following, using the DCT transform as an example, we describe different embodiments for designing adaptive transform. In particular, based on the prediction residuals of a first color component, we may adjust the phases of the transform basis functions for another color component. This technique can be applied to other types of transforms. It should be noted that the type of transform is not limited to the example based on the trigonometric transform (e.g., DCT, DST), for example, the technique can also be used to adjust KLT.

In one embodiment, we consider the 2D separable DCT transform and we determine the best phases of the basis functions in each direction (horizontal and vertical) according to a given criterion. In this case, the set of basis functions is separated into horizontal and vertical transform matrices $C_X$ and $C_Y$, which can be defined as follows:

$$C_X = [c_X(i, j)]_{N \times N} \text{ and } c_X(i, j) = \alpha(i)\cos\left(\frac{(2j+1)}{2N} \cdot i \cdot \pi\right) \quad (1)$$

$$\text{with } \alpha(i) = \begin{cases} \sqrt{\frac{1}{N}} & i = 0 \\ \sqrt{\frac{2}{N}} & i \neq 0 \end{cases}$$

$$C_Y = [c_Y(i, j)]_{N \times N} \text{ and } c_Y(i, j) = \alpha(j)\cos\left(\frac{(2i+1)}{2N} \cdot j \cdot \pi\right) \quad (2)$$

$$\text{with } \alpha(j) = \begin{cases} \sqrt{\frac{1}{N}} & j = 0 \\ \sqrt{\frac{2}{N}} & j \neq 0 \end{cases}$$

wherein N×N is the transform size, $c_X(i,j)$ and $c_Y(i,j)$ are elements in the transform matrices $C_X$ and $C_Y$, and a row (e.g., $[c_X(i,j)]$, j=1, . . . , N) in the transform matrix is a transform basis function.

The forward transform can be expressed as $$B = [B(u,v)]_{N \times N} = C_X \cdot b \cdot C_Y \quad (3)$$

wherein $b = [b(i,j)]_{N \times N}$ is the block to be transformed, B is the transformed block, and (u,v) are the coordinates of a coefficient in the frequency domain. The inverse transform can be expressed as:

$$b = [b(i,j)]_{N \times N} = C_Y \cdot B \cdot C_X. \quad (4)$$

In a typical video encoder, intra or inter prediction is used to reduce the redundancy by approximating a current block with previously reconstructed content. The prediction process outputs a predictor for the current block and a block of prediction residuals. The block of prediction residuals is then transformed into a block of transform coefficients that is quantized and coded into a bitstream. Applying the transform matrices $C_X$ and $C_Y$, the block of prediction residuals $b_{er} = [b_{er}(i,j)] N_{N \times N}$ can be transformed into transform coefficients:

$$B_{er} = [B_{er}(u,v)]_{N \times N} = C_X \cdot b_{er} \cdot C_Y$$

The transform coefficients $B_{er}$ can be quantized. The quantized transform coefficients can be de-quantized and inverse transformed to obtain the reconstructed prediction residuals:

$$b_{erQ} = [b_{erQ}(i,j)]_{N \times N} = C_Y \cdot B_{erQ} \cdot C_X$$

wherein $B_{erQ} = [B_{erQ}(u,v)]_{N \times N}$ are the de-quantized transform coefficients for the current block, and $b_{erQ}$ is the block of reconstructed prediction residuals.

To improve the compression efficiency, we may adjust the phases of the transform basis functions. One goal is to adjust the phases of the transform basis such that a signal becomes sparsest in the transform domain, namely, the transformed signal is the sparsest. For 2D separable DCT of N×N block size, $C_X$ is composed of N basis functions, and $C_Y$ is also composed of N basis functions. We may adapt the phases of the basis functions, for example, by shifting each basis function in $C_X$ by a phase shift factor $\phi x$, and by shifting each basis function in $C_Y$ by a phase shift factor $\phi y$. The new basis functions can be expressed as:

$$C_{\phi x} = [c_{\phi x}(i, j)]_{N \times N} \text{ and } c_{\phi x}(i, j) = \alpha(i)\cos\left(\frac{(2(j+\phi x)+1)}{2N} \cdot i \cdot \pi\right)$$

$$C_{\phi y} = [c_{\phi y}(i, j)]_{N \times N} \text{ and } c_{\phi y}(i, j) = \alpha(j)\cos\left(\frac{(2(i+\phi y)+1)}{2N} \cdot j \cdot \pi\right)$$

The new set of basis functions $C_{\phi x}$ or $C_{\phi y}$ is still orthogonal.

Figure 3:
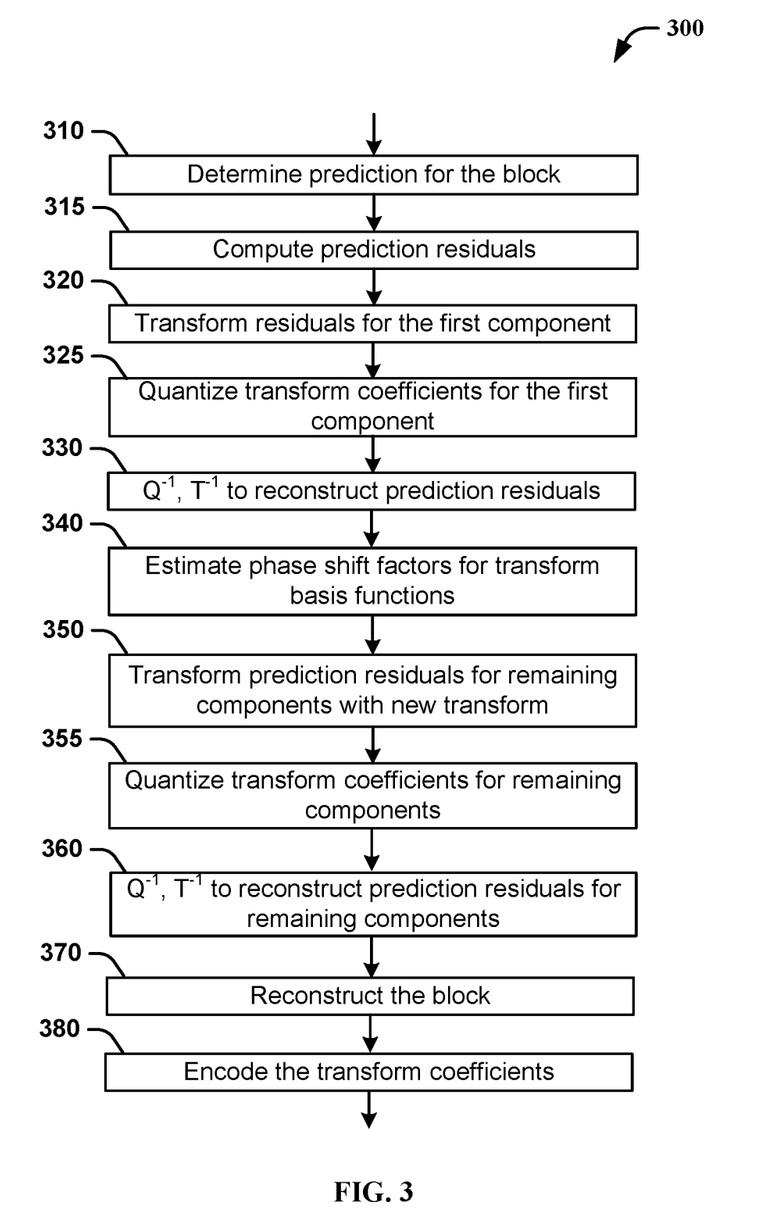
FIG. 3 illustrates an exemplary method of phase adjustment for transform basis functions at the encoder side, according to an embodiment.

FIG. 3 illustrates an exemplary method 300 of phase adjustment for transform basis functions at the encoder side, according to an embodiment. For a current block to be encoded, at step 310, intra or inter prediction is used to obtain the prediction for the block. The prediction residuals, namely, the difference between the current block and the predicted block, are computed at step 315.

The prediction residuals for the first component are then transformed (320), for example, using the DCT as described in Eq, (3):

$$B_{er}{}^{c0} = [B_{er}{}^{c0}(u,v)]_{N \times N} = C_X \cdot b_{er}{}^{c0} \cdot C_Y$$

wherein the superscript "$c_0$" denotes the first color component. The transformed coefficients are then quantized (325). The first component could be the luminance or another component. The transform dedicated to the first component of block can be pre-defined or can be chosen at the encoder side and be indicated to the decoder side using a syntax element.

The quantized transform coefficients are then de-quantized (330), and the de-quantized transform coefficients $(B_{erQ}{}^{c0})$ are inverse transformed (330) to reconstruct the prediction residuals:

$$b_{erQ}{}^{c0} = [b_{erQ}{}^{c0}(i,j)]_{N \times N} = C_Y \cdot B_{erQ}{}^{c0} \cdot C_X.$$

From the decoded residual block $b_{erQ}{}^{c0}$ of the first component, the phase shift factors, $\phi x$ and $\phi y$, can be estimated (340) in order to adjust the basis functions horizontal and vertical directions, respectively:

$$C_{\phi x} = [c_{\phi x}(i, j)]_{N \times N} \text{ and } c_{\phi x}(i, j) = \alpha(i)\cos\left(\frac{(2(j+\phi x)+1)}{2N} \cdot i \cdot \pi\right) \quad (5)$$

$$C_{\phi y} = [c_{\phi y}(i, j)]_{N \times N} \text{ and } c_{\phi y}(i, j) = \alpha(j)\cos\left(\frac{(2(i+\phi y)+1)}{2N} \cdot j \cdot \pi\right) \quad (6)$$

As shown in Eqs. (5) and (6), the phase shift factors ($\phi x$ and $\phi y$) can be represented in the unit of pixels, integer or not. It should be noted that the phase shift factors can have an infinite floating-point accuracy, because $\phi x$ and $\phi y$ are introduced in the analytical formulation to compute the new transform matrices ($C_{\phi x}$ and $C_{\phi y}$), the phase shift factor accuracy is not limited to pel, half-pel or quarter-pel accuracy. All the basis functions in a given direction (x or y) are adjusted with the same phase shift factor so as to conserve the orthogonal properties of the DCT basis functions. For instance, $\phi x = 2.126$ pixels for all basis functions in $C_{\phi x}$, and $\phi y = -3.031$ pixels for all basis functions in $C_{\phi y}$.

The basis functions can be further adjusted, for example, to be represented in integer coefficients within a given dynamic range. The elements ($c_{\phi x}(i,j)$, $c_{\phi y}(i,j)$) in the transform matrices may be scaled, and the norm of the transform should be taken into consideration when designing quantization and normalization.

The prediction residuals of the remaining color components for the block ($b_{er}^{ck}$, k=1,2) can be transformed (350) based on the adjusted transform basis functions:

$$b_{er}^{ck} = [B_{er}^{ck}(u,v)]_{N \times N} = C_{\phi x} \cdot b_{er}^{ck} \cdot C_{\phi y}, k=1,2$$

The transform coefficients for the remaining color components are then quantized (355) and encoded into the bitstream. The quantized transform coefficients are de-quantized and inverse transformed (360) to reconstruct prediction residuals for the remaining components. The inverse transform can be performed on the de-quantized transform coefficients ($B_{erQ}^{ck}$, k=1,2) as:

$$b_{erQ}^{ck} = [b_{erQ}^{ck}(i,j)]_{N \times N} = C_{\phi y}' \cdot B_{erQ}^{ck} \cdot C_{\phi x}, k=1,2$$

Based on the reconstructed prediction residuals ($b_{erQ}^{ck}$, k=0,1,2) and the predicted block, the current block can be reconstructed (370). The transform coefficients for different color components can be encoded (380) into the bitstream, for example, using an entropy encoder.

By using a known transform on a first color component, and then adapting the transform for other color components based on the prediction residuals of the first color component, the sparsity of the transform coefficients in the other color components tray be improved. In general, the adaptation of the transform can be seen as the improvement of the synergy between the prediction stage and the transform stages, which may be able to improve the video coding performance. The adaptive transform is determined at both encoder and decoder sides.

Figure 4:
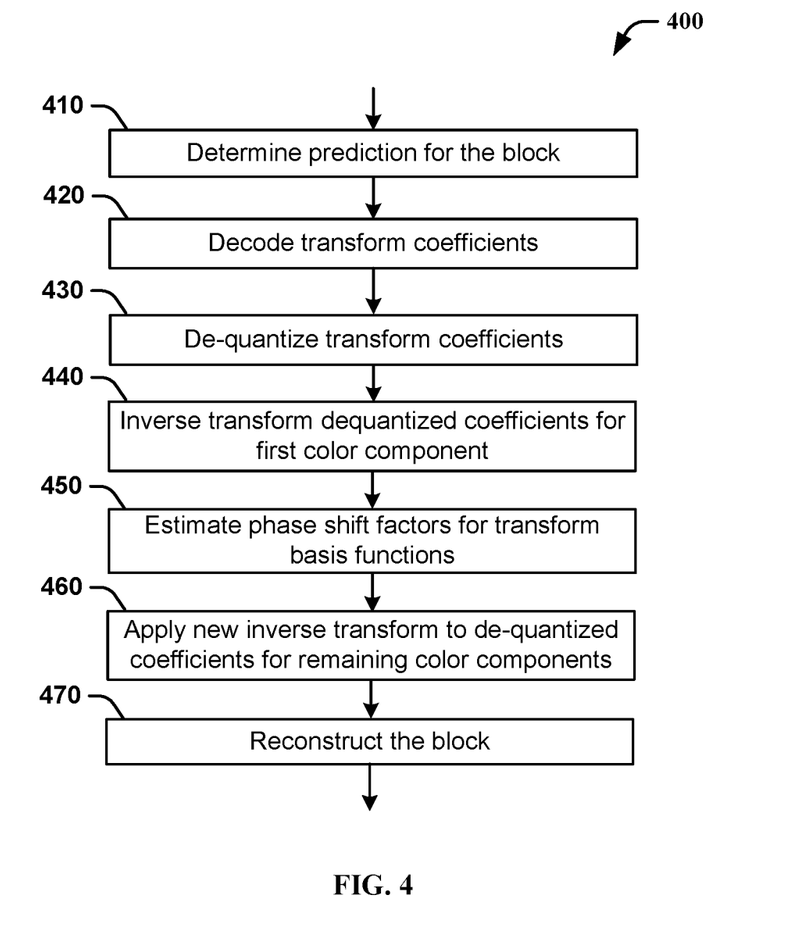
FIG. 4 illustrates an exemplary method of phase adjustment for transform basis functions at the decoder side, according to an embodiment.

FIG. 4 illustrates an exemplary method 400 of phase adjustment for transform basis functions at the decoder side, according to an embodiment. The input to method 400 may be a bitstream generated, for example, using method 300. For a current block to be decoded, at step 410, intra or inter prediction is used to obtain the prediction for the current block. The transform coefficients are decoded (420), and then de-quantized (430). The de-quantized transform coefficients for the first color component are inverse transformed (440) to generate the prediction residuals for the first color component:

$$b_{erQ}^{c0} = [b_{erQ}^{c0}(i,j)]_{N \times N} = C_Y \cdot B_{erQ}^{c0} \cdot C_X.$$

From the decoded residual block $b_{erQ}^{c0}$ for the first color component, the phase shift factors, $\phi x$ and $\phi y$, can be estimated (450) in order to adjust the basis functions for transforming the remaining residual color components. In order for a bitstream to be properly decoded, the same method for estimating the phase shift factors should be used at the encoder and decoder sides.

The de-quantized transform coefficients ($B_{erQ}^{ck}$, k=1,2) for remaining color components are inverse transformed (460) to generate prediction residuals for the remaining components. The inverse transform can be performed as:

$$b_{erQ}^{ck} = [b_{erQ}^{ck}(i,j)]_{N \times N} = C_{\phi y}' \cdot B_{erQ}^{ck} \cdot C_{\phi x}, k=1,2$$

Based on the reconstructed prediction residuals ($b_{erQ}^{ck}$, k=0,1,2) and the predicted block, the current block can be reconstructed (470).

It should be noted that for some blocks, the quantization may be skipped, for example, in a lossless coding mode. In that case, the transform is adapted based on the decoded prediction residuals themselves. Namely, quantization and de-quantization in steps 325, 330, 355 and 360 in method 300, and step 430 in method 400 can be skipped. In addition, at step 330 or 440, the inverse transform would be applied to the transform coefficients, rather than to the de-quantized transform coefficients.

In the following, different methods of estimating the phase shift factors, $\phi x$ and $\phi y$, are described in further detail.

Phase Shift Factor Determination

As described before, by adjusting the phases of the transform basis functions, the sparsity of transform coefficients, and thus the compression efficiency, may be improved. In general, we estimate the phase shift factors from the block of the reconstructed prediction residuals ($b_{erQ}^{c0}$) of the first color component. Based on different criteria, different methods are developed.

In one embodiment, a sparsity measure is used to estimate the phase shift factors. Usually a sparsity measure is based on the number of non-zero coefficients. Here, we adjust the sparsity measure to indicate the number of non-zero coefficients greater than a given threshold $\varepsilon$. The threshold $\varepsilon$ can be dependent on the quantization step size (Qstep) of the encoder/decoder used to encode the coefficients of the current block (ex: $\varepsilon$=Qstep).

In one example, the sparsity measure can be:

$$J((\Phi x, \Phi y) | \epsilon) = L_\varepsilon^0(B_{erQ,\phi}^{c0}) \qquad (7)$$

with $$B_{erQ,\phi}^{c0} = [B_{erQ,\phi}^{c0}(u,v)]_{N \times N} = C_{\phi x} \cdot b_{erQ}^{c0} \cdot C_{\phi y}$$

$$L_\varepsilon^0(B_{erQ,\phi}^{c0}) = \sum_{u=0}^{N-1} \sum_{v=0}^{N-1} ((|B_{erQ,\phi}^{c0}(u,v)| > \varepsilon)?1:0)$$

where (x>$\varepsilon$?1:0) corresponds to $$\begin{cases} 1, x > \varepsilon \\ 0, x \le \varepsilon \end{cases}.$$

Here, the reconstructed prediction residuals ($b_{erQ}^{c0}$) would go through the transform with the phases adjusted. Then the transform coefficients ($b_{erQ,\phi}^{c0}$) based on the new transform are used to measure the sparsity criterion. Based on the sparsity criterion ($L_\varepsilon^0$), the phase shill factor pair $\Phi x_{opt}, \Phi y_{opt}$ can be estimated as the pair providing the smallest sparsity measure:

$$(\Phi x_{opt}, \Phi y_{opt}) = \arg\min_{\Phi x, \Phi y} (J((\Phi x, \Phi y) | \epsilon))$$

In another embodiment, the criterion can be pseudo-RDO (Rate Distortion Optimization), which may be more efficient but more complex than the method based on Eq. (7):

$$J((\phi x,\phi y)|\in,\lambda) = \Sigma_{i=0}^{N-1}\Sigma_{j=0}^{N-1}(b_{erQ}^{c0}(i,j) - b_{erQ,\phi/\varepsilon}^{c0}(i,j))^2 + \lambda \times L_\varepsilon^0(B_{erQ,\phi}^{c0}) \qquad (8)$$

with $$b_{erQ,\phi/\varepsilon}^{c0} = [b_{erQ,\phi/\varepsilon}^{c0}(i,j)]_{N \times N} = C_{\phi y}' \cdot b_{erQ,\phi/\varepsilon}^{c0} \cdot C_{\phi x}$$

$$B_{erQ,\phi/\varepsilon}^{c0} = [B_{erQ,\phi/\varepsilon}^{c0}(u,v)]_{N \times N} \text{ and} \qquad (9)$$

$$\begin{cases} \text{if } |B_{erQ,\phi}^{c0}(u,v)| > \varepsilon & \{B_{erQ,\phi/\varepsilon}^{c0}(u,v) = B_{erQ,\phi}^{c0}(u,v)\} \\ \text{else} & \{B_{erQ,\phi/\varepsilon}^{c0}(u,v) = 0\} \end{cases}$$

and λ the Lagrangian factor that could be a function of the quantization step size used in a video coder, such as those used in the H.264 and HEVC reference software.

Note here $b_{erQ}^{c0}$ is the decoded block of prediction residuals of the first color component from the initial transform, and $B_{erQ,\phi}^{c0}$ is the transformed results for $b_{erQ}^{c0}$ using adjusted transform, After applying the threshold ε (Eq. (9)) to $B_{erQ,\phi}^{c0}$, the resulting $B_{erQ,\phi/\epsilon}^{c0}$ can be inverse transformed to get a new block of prediction residuals (($b_{erQ,\phi/\epsilon}^{c0}$)). The process of transforming $b_{erQ}^{c0}$ using adjusted transform, thresholding by ε, followed by inverse transform, closely simulates the residual reconstruction for the remaining color components, and therefore the distortion term ($\Sigma_{i=0}^{N-1} \Sigma_{j=0}^{N-1} (b_{erQ}^{c0}(i,j) - b_{erQ,\phi/\epsilon}^{c0}(i,j))^2$), as the sum of square differences in the pixel domain between blocks $b_{erQ}^{c0}$ and $b_{erQ,\phi/\epsilon}^{c0}$ may accurately estimate the distortion from one particular adjusted transform. Because the best candidate basis functions are supposed to lower the energy of high frequencies, minimizing the distortion term, regulated by the sparsity, as shown in Eq. (9) may obtain the phase shift factors that correspond to a block ($b_{erQ,\phi/\epsilon}^{c0}(i,j)$) close to ($b_{erQ}^{c0}$). Because different color components in one block are usually shifted similarly in the spatial domain, applying the phase shift factor obtained as described above may also compact the energy of transform coefficients in another color component, and therefore may improve the compression efficiency.

Based on this criterion, the phase shift factor pair $\Phi x_{opt}$, $\Phi y_{opt}$ can be estimated as:

$$(\Phi x_{opt}, \Phi y_{opt}) = \arg\min_{\Phi x, \Phi y} (J((\Phi x, \Phi y) | \epsilon, \lambda))$$

Figure 5:
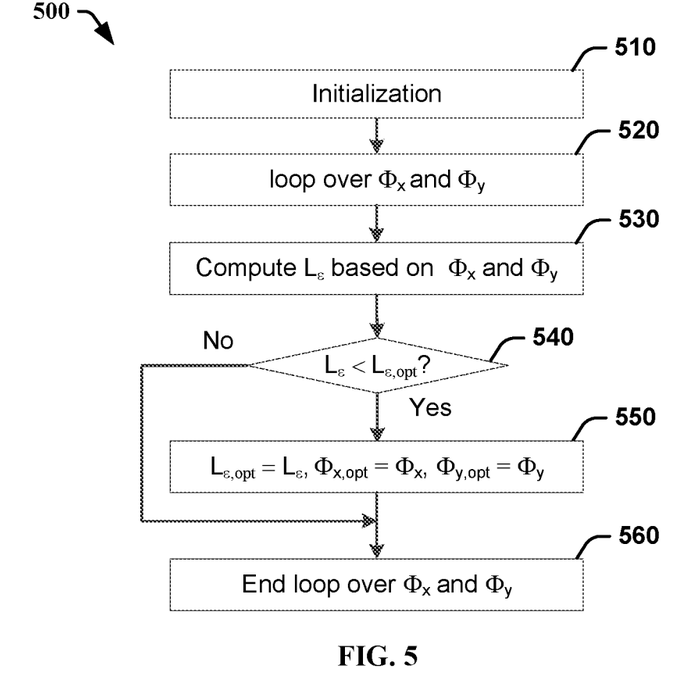
FIG. 5 illustrates an exemplary method for deriving the phase shift factors using a sparsity criterion, according to an embodiment.

FIG. 5 illustrates an exemplary method 500 for deriving the phase shift factors using a sparsity criterion, according to an embodiment. Method 500 can be implemented at the encoder or decoder side. At the initialization (510), different parameters may be initialized. For example, the threshold E is set and an initial minimum sparsity measure ($L_{\epsilon,opt}$) is set to a large number. The phase shift factors $\Phi x$, $\Phi y$ can be searched using a numerical method (520), for example, using an iteration from 0 to N/2 (or other values) in each direction at a pre-defined pixel step. Non-limiting examples of the pixel step include an integer-pel, half-pel and quarter-pel accuracy. For a particular pair of candidate ($\Phi x$, $\Phi y$), the sparsity measure ($L_\epsilon$) is calculated (530). If the current sparsity measure ($L_\epsilon$) is smaller (540) than $L_{\epsilon,opt}$ is replaced by L, and $\Phi x_{opt}$, $\Phi y_{opt}$ are set (550) to current $\Phi x$, $\Phi y$, respectively. At the end of the search (560), the phase shift factors ($\Phi x_{opt}$, $\Phi y_{opt}$ are obtained. In one example, the obtained $\Phi x_{opt}$=2.126 and $\Phi y_{opt}$=3.031 pixels. The method using other criteria can be performed similarly to method 500.

In the above, we describe the adaptation of the phases of the basis functions for the DCT transform. When an encoder or decoder uses a DCT-based transform derived from the DCT for the first color component, the new transform basis functions for other components can also be adjusted. For example, as described before, when designing the transform basis, HEVC would limit the dynamic range for transform computation and maximize the precision and closeness to orthogonality when the matrix entries are specified as integer values. When the HEVC core transform is used for the first color component, we may still derive the phase shift factors for the transform basis functions based on the DCT transform for other color components as described above. However, the new transform basis would further be converted to be specified in integer numbers, and also apply other restrictions as those have been applied to the transform for the first color component. In addition to the phase shift factors as described above, other phase factors can be used to adjust the transform basis functions.

When chroma sub-sampling is used in the color format, the first color component and the other color component may have different block sizes. In this case, the phase shift factors determined based on the first color component can be scaled based on the sub-sampling ratio, or more generally based on a ratio between the block sizes for the different color components. For example, for a 4:2:0 YIN video, if the first component is Y, the phase shift factors $\Phi x_{opt}$, $\Phi y_{opt}$ found using the first component can be divided by 2 as the remaining components (U, V) are subsampled at a ratio of 2. In another example for a 4:2:0 video, if the first component is U, then the phase shill factors $\Phi x_{opt}$, $\Phi y_{opt}$ are applied directly to the basis functions for the V component since U and V components are at the same size, and the phase shift factors are multiplied by two when being applied to the basis functions for the Y component.

By using the information from one color component of the block to adapt the transform for another color component in the block, the parameters associated with the transform can be computed at both the encoder and decoder sides, and thus no, or very few, additional metadata need to be sent to indicate the transform. In order for the bitstream to be properly decoded, the encoder and decoder should use the same adaptation schemes. For example, the threshold parameter (ε), the Lagrangian factor (λ) and the first component indicator (i.e., a signal indicating which color component to be used as the first color component that is used as the basis of deriving the new transform basis functions for other color components) should be identical at the encoder and decoder. This can be achieved by storing the values at both the encoder or decoder, or signal the information using syntax elements in the bitstream. Because transmitting the transform information, especially for small block sizes, is costly, adjusting the transform locally (i.e., at the block level) according to the present embodiments enables adaptive transform for different block sizes without introducing a large signaling overhead.

Various methods are described above, and each of the methods comprises one or more steps or actions for achieving the described method. Unless a specific order of steps or actions is required for proper operation of the method, the order and/or use of specific steps and/or actions may be modified or combined.

Various numeric values are used in the present application, for example, three color components are used for the video format. It should be noted that the specific values are for exemplary purposes and the present embodiments are not limited to these specific values.

Various methods of adapting the transform as described above can be used to modify the transform and inverse transform modules (125, 150, 240) of the JVET (Joint Video Exploration Team) or HEVC encoder and decoder as shown in FIG. 1 and FIG. 2, In addition, the quantization and de-quantization modules (130, 140, 240) may be adjusted to take into consideration of the norms of the transform matrices. However, the present embodiments are not limited to JVET or HEVC, and can be applied to other standards, recommendations, and extensions thereof. Various embodiments described above can be used individually or in combination. The phase adjustment can also be applied when transform is used in other applications, for example, in the context of the use of multi-sensor (e.g., visible and IR) of the same scene when the registration is bad using for example homography.

Figure 6:
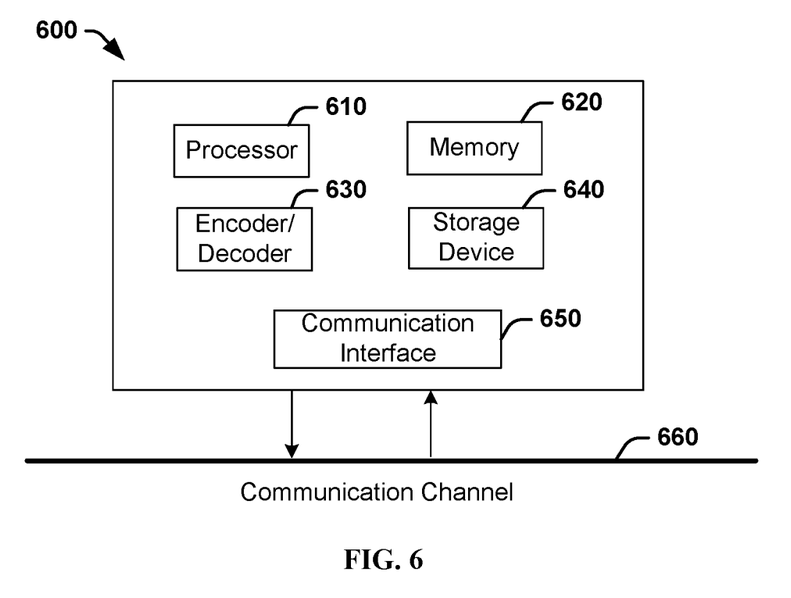
FIG. 6 illustrates a block diagram of an exemplary system in which various aspects of the exemplary embodiments may be implemented.

FIG. 6 illustrates a block diagram of an exemplary system in which various aspects of the exemplary embodiments may be implemented. System 600 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, and servers. System 600 may be communicatively coupled to other similar systems, and to a display via a communication channel as shown in FIG. 6 and as known by those skilled in the art to implement the exemplary video system described above.

The system 600 may include at least one processor 610 configured to execute instructions loaded therein for implementing the various processes as discussed above. Processor 610 may include embedded memory, input output interface and various other circuitries as known in the art. The system 600 may also include at least one memory 620 (e.g., a volatile memory device, a non-volatile memory device). System 600 may additionally include a storage device 620, which may include non-volatile memory, including, but not limited to, EEPROM, ROM, PROM, RAM, DRAM, SRAM, flash, magnetic disk drive, and/or optical disk drive. The storage device 640 may comprise an internal storage device, an attached storage device and/or a network accessible storage device, as non-limiting examples. System 600 may also include an encoder/decoder module 630 configured to process data to provide an encoded video or decoded video.

Encoder/decoder module 630 represents the module(s) that may be included in a device to perform the encoding and/or decoding functions. As is known, a device may include one or both of the encoding and decoding modules. Additionally, encoder/decoder module 630 may be implemented as a separate element of system 600 or may be incorporated within processors 610 as a combination of hardware and software as known to those skilled in the art.

Program code to be loaded onto processors 610 to perform the various processes described hereinabove may be stored in storage device 640 and subsequently loaded onto memory 620 for execution by processors 610. In accordance with the exemplary embodiments, one or more of the processor(s) 610, memory 620, storage device 640 and encoder/decoder module 630 may store one or more of the various items during the performance of the processes discussed herein above, including, but not limited to the input video, the decoded video, the bitstream, equations, formula, matrices, variables, operations, and operational logic.

The system 600 may also include communication interface 650 that enables communication with other devices via communication channel 660. The communication interface 650 may include, but is not limited to a transceiver configured to transmit and receive data from communication channel 660. The communication interface may include, but is not limited to, a modem or network card and the communication channel may be implemented within a wired and/or wireless medium. The various components of system 600 may be connected or communicatively coupled together using various suitable connections, including, but not limited to internal buses, wires, and printed circuit boards.

The exemplary embodiments may be carried out by computer software implemented by the processor 610 or by hardware, or by a combination of hardware and software. As a non-limiting example, the exemplary embodiments may be implemented by one or more integrated circuits. The memory 620 may be of any type appropriate to the technical environment and may be implemented using any appropriate data storage technology, such as optical memory devices, magnetic memory devices, semiconductor-based memory devices, fixed memory and removable memory, as non-limiting examples. The processor 610 may be of any type appropriate to the technical environment, and may encompass one or more of microprocessors, general purpose computers, special purpose computers and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information, Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application or its claims may refer to "receiving" various pieces of information, Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for video decoding, comprising:
accessing quantized transform coefficients of a first color component and a second color component for a block of a picture;
de-quantizing said quantized transform coefficients of said first and second color components;
obtaining prediction residuals for said first color component of said block, by inverse transforming said de-quantized transform coefficients for said first color component of said block using a first transform, said first transform corresponding to at least a first set of transform basis functions;
determining a phase shift factor based on said obtained prediction residuals for said first color component of said block, by performing:
    transforming said prediction residuals for said first color component with a plurality of candidate transforms, wherein each candidate transform is based on said first transform and a candidate phase shift factor of a plurality of candidate phase shift factors,
    determining a sparsity based on transform coefficients obtained from a respective one of said plurality of candidate transforms, and
    selecting a candidate phase shift factor corresponding to a candidate transform with a smallest sparsity as said phase shift factor;
obtaining prediction residuals for said second color component of said block, by inverse transforming said de-quantized transform coefficients for said second color component of said block using a second transform, said second transform corresponding to at least a second set of transform basis functions, wherein a transform basis function of said first set of transform basis functions is adjusted based on said determined phase shift factor to form a respective transform basis function of said second set of transform basis functions; and
reconstructing said block based on said obtained prediction residuals and a predicted block for said block.

2. The method of claim 1, wherein said determined phase shift factor is scaled by a subsampling ratio between said first and second color components.

3. A method for video encoding, comprising:
accessing prediction residuals of a first color component and a second color component for a block of a picture;
transforming said prediction residuals for said first color component of said block to form transform coefficients for said first color component of said block, using a first transform, said first transform corresponding to at least a first set of transform basis functions;
determining reconstructed prediction residuals for said first color component of said block based on said transform coefficients for said first color component of said block;
determining a phase shift factor based on said reconstructed prediction residuals for said first color component of said block, by performing:
    transforming said reconstructed prediction residuals for said first color component with a plurality of candidate transforms, wherein each candidate transform is based on said first transform and a candidate phase shift factor of a plurality of candidate phase shift factors,
    determining a sparsity based on transform coefficients obtained from a respective one of said plurality of candidate transforms, and
    selecting a candidate phase shift factor corresponding to a candidate transform with a smallest sparsity as said phase shift factor;
transforming said prediction residuals for said second color component of said block to form transform coefficients for said second color component of said block, using a second transform, said second transform corresponding to at least a second set of transform basis functions, wherein a transform basis function of said first set of transform basis functions is adjusted based on said determined phase shift factor to form a respective transform basis function of said second set of transform basis functions; and
encoding said transform coefficients for said first and second color components of said block.

4. The method of claim 3, wherein said determined phase shift factor is scaled by a subsampling ratio between said first and second color components.

5. An apparatus for video decoding, comprising:
one or more processors, wherein said one or more processors are configured to:
access quantized transform coefficients of a first color component and a second color component for a block of a picture;
de-quantize said quantized transform coefficients of said first and second color components;
obtain prediction residuals for said first color component of said block, by inverse transforming said de-quantized transform coefficients for said first color component of said block using a first transform, said first transform corresponding to at least a first set of transform basis functions;
determine a phase shift factor based on said obtained prediction residuals for said first color component of said block, by performing:
    transforming said prediction residuals for said first color component with a plurality of candidate transforms, wherein each candidate transform is based on said first transform and a candidate phase shift factor of a plurality of candidate phase shift factors,
    determining a sparsity based on transform coefficients obtained from a respective one of said plurality of candidate transforms, and
    selecting a candidate phase shift factor corresponding to a candidate transform with a smallest sparsity as said phase shift factor;

obtain prediction residuals for said second color component of said block, by inverse transforming said dequantized transform coefficients for said second color component of said transform said prediction residuals for said second color component of said block to form transform coefficients for said second color component of said block, using a second transform, said second transform corresponding to at least a second set of transform basis functions, wherein a transform basis function of said first set of transform basis functions is adjusted based on said determined phase shift factor to form a respective transform basis function of said second set of transform basis functions; and encode said transform coefficients for said first and second color components of said block.

6. The apparatus of claim 5, wherein said determined phase shift factor is scaled by a subsampling ratio between said first and second color components.

7. An apparatus for video encoding, comprising:

one or more processors, wherein said one or more processors are configured to:

access prediction residuals of a first color component and a second color component for a block of a picture;

transform said prediction residuals for said first color component of said block to form transform coefficients for said first color component of said block, using a first transform, said first transform corresponding to at least a first set of transform basis functions;

determine reconstructed prediction residuals for said first color component of said block based on said transform coefficients for said first color component of said block, by performing:

transforming said reconstructed prediction residuals for said first color component with a plurality of candidate transforms, wherein each candidate transform is based on said first transform and a candidate phase shift factor of a plurality of candidate phase shift factors, determining a sparsity based on transform coefficients obtained from a respective one of said plurality of candidate transforms, and selecting a candidate phase shift factor corresponding to a candidate transform with a smallest sparsity as said phase shift factor;

determine a phase shift factor based on said reconstructed prediction residuals for said first color component of said block; block using a second transform, said second transform corresponding to at least a second set of transform basis functions, wherein a transform basis function of said first set of transform basis functions is adjusted based on said determined phase shift factor to form a respective transform basis function of said second set of transform basis functions; and reconstruct said block based on said obtained prediction residuals and a predicted block for said block.

8. The apparatus of claim 7, wherein said determined phase shift factor is scaled by a subsampling ratio between said first and second color components.

9. A non-transitory computer readable medium comprising instructions which, when the instructions are executed by a computer, cause the computer to perform the method of claim 1.

10. A non-transitory computer readable medium comprising instructions which, when the instructions are executed by a computer, cause the computer to perform the method of claim 3.

11. The method of claim 1, wherein elements for a transform matrix corresponding to said second transform are represented in integers.

12. The method of claim 3, wherein elements for a transform matrix corresponding to said second transform are represented in integers.

13. The apparatus of claim 5, wherein elements for a transform matrix corresponding to said second transform are represented in integers.

14. The apparatus of claim 7, wherein elements for a transform matrix corresponding to said second transform are represented in integers.

* * * * *